United States Patent
Brown et al.

(10) Patent No.: US 9,518,162 B2
(45) Date of Patent: Dec. 13, 2016

(54) PROCESS OF MAKING A CONTINUOUS DIELECTRIC FILM COMPRISING DISPERSED NANOPARTICLES

(71) Applicant: THE SECRETARY OF STATE FOR DEFENCE, London (GB)

(72) Inventors: Matthew Adrian Brown, Reading (GB); Michelle Silverstone Lang, Reading (GB)

(73) Assignee: The Secretary of State for Defence, London (GB)

( * ) Notice: Subject to any disclaimer, the term of this patent is extended or adjusted under 35 U.S.C. 154(b) by 29 days.

(21) Appl. No.: 14/413,458

(22) PCT Filed: Jul. 12, 2013

(86) PCT No.: PCT/GB2013/000302
§ 371 (c)(1),
(2) Date: Jan. 8, 2015

(87) PCT Pub. No.: WO2014/009686
PCT Pub. Date: Jan. 16, 2014

(65) Prior Publication Data
US 2015/0291747 A1 Oct. 15, 2015

(30) Foreign Application Priority Data
Jul. 13, 2012 (GB) .................................. 1212487.1

(51) Int. Cl.
| | | |
|---|---|---|
| C08K 3/22 | (2006.01) |
| C08J 5/18 | (2006.01) |
| B29C 47/00 | (2006.01) |
| B29C 47/10 | (2006.01) |
| B29C 47/88 | (2006.01) |
| B29C 47/04 | (2006.01) |
| H01G 4/18 | (2006.01) |
| H01G 4/20 | (2006.01) |
| C08K 3/08 | (2006.01) |
| H01B 3/44 | (2006.01) |
| B29K 105/16 | (2006.01) |
| B29K 105/12 | (2006.01) |
| B29B 7/90 | (2006.01) |
| H01G 4/14 | (2006.01) |
| B29C 43/22 | (2006.01) |
| B29K 25/00 | (2006.01) |
| B29K 505/00 | (2006.01) |
| B29K 505/14 | (2006.01) |

(52) U.S. Cl.
CPC ............. *C08J 5/18* (2013.01); *B29C 47/0004* (2013.01); *B29C 47/0021* (2013.01); *B29C 47/0076* (2013.01); *B29C 47/04* (2013.01); *B29C 47/1018* (2013.01); *B29C 47/1027* (2013.01); *B29C 47/8845* (2013.01); *C08K 3/08* (2013.01); *C08K 3/22* (2013.01); *H01B 3/442* (2013.01); *H01G 4/18* (2013.01); *H01G 4/206* (2013.01); *B29B 7/90* (2013.01); *B29C 43/222* (2013.01); *B29C 47/0026* (2013.01); *B29C 2947/92219* (2013.01); *B29C 2947/92714* (2013.01); *B29K 2025/06* (2013.01); *B29K 2105/122* (2013.01); *B29K 2105/124* (2013.01); *B29K 2105/162* (2013.01); *B29K 2505/00* (2013.01); *B29K 2505/14* (2013.01); *B29K 2995/0006* (2013.01); *C08J 2325/06* (2013.01); *C08K 2003/0806* (2013.01); *C08K 2003/2241* (2013.01); *H01G 4/14* (2013.01)

(58) Field of Classification Search
CPC .............................................. C08K 2003/2241
USPC .................................................. 524/497, 577
See application file for complete search history.

(56) References Cited

U.S. PATENT DOCUMENTS

| | | |
|---|---|---|
| 2005/0256242 A1 | 11/2005 | Ottaviani et al. |
| 2007/0092716 A1 | 4/2007 | Guo et al. |
| 2007/0116976 A1 | 5/2007 | Tan et al. |
| 2007/0176319 A1 | 8/2007 | Thostenson et al. |
| 2009/0045544 A1 | 2/2009 | Silvi et al. |
| 2009/0275689 A1 | 11/2009 | Isayev |

(Continued)

FOREIGN PATENT DOCUMENTS

| | | |
|---|---|---|
| CN | 1900169 A | 1/2007 |
| CN | 101389470 A | 3/2009 |

(Continued)

OTHER PUBLICATIONS

International Patent Application No. PCT/GB2013/000302, International Preliminary Report on Patentability mailed Jan. 13, 2015, 8 pages.

(Continued)

*Primary Examiner* — Edward Cain
(74) *Attorney, Agent, or Firm* — Dean W. Russell; Kilpatrick Townsend & Stockton LLP

(57) ABSTRACT

The invention provides a process of making a continuous freeform thermoplastic dielectric film (25) that is evenly loaded with dispersed nanoparticles comprising the steps of; feeding thermoplastic granules (21) into an extruder (23), injecting a secondary feed (27) comprising a suspension of nanoparticles in a liquid carrier to create a nanocomposite, and extruding said composite onto cooled rollers (26) at a preset rate thereby enabling the crystalline structure of the nanocomposite film (25) to be controlled wherein the secondary feed (27) is mixed continuously by an ultrasonicator (29) whilst being injected into the extruder (23). By selecting the size of the nano particles based on their de Broglie wavelength in the crystalline polymer the dielectric can be produced in bulk to make high capacitance high energy density storage capacitors

7 Claims, 1 Drawing Sheet

(56) References Cited

U.S. PATENT DOCUMENTS

| | | |
|---|---|---|
| 2010/0038817 A1 | 2/2010 | Glende et al. |
| 2010/0267883 A1 | 10/2010 | Bhatt |

FOREIGN PATENT DOCUMENTS

| | | |
|---|---|---|
| DE | 102011009433 A1 | 7/2012 |
| EP | 2025496 A2 | 2/2009 |
| EP | 2154177 A2 | 2/2010 |
| EP | 2305743 A1 | 4/2011 |
| EP | 2441792 A1 | 4/2012 |
| EP | 2441793 A1 | 4/2012 |
| GB | 2478843 A | 9/2011 |
| JP | 2000269070 A | 9/2000 |
| JP | 2001172412 A | 6/2001 |
| JP | 2002252143 A | 9/2002 |
| JP | 2003136658 A | 5/2003 |
| JP | 2005056935 A | 3/2005 |
| JP | 2006032235 A | 2/2006 |
| JP | 2006287203 A | 10/2006 |
| JP | 2011077038 A | 4/2011 |
| TW | 408345 B | 10/2000 |
| WO | 2005014259 A1 | 2/2005 |
| WO | 2011114100 A1 | 9/2011 |

OTHER PUBLICATIONS

United Kingdom Patent Application No. 1212487.1, Search Report mailed Nov. 13, 2012, 4 pages.

International Patent Application No. PCT/GB2013/000302, International Search Report and Written Opinion mailed Nov. 5, 2013, 12 pages.

United Kingdom Patent Application No. 1312516.6, Combined Search and Examination Report mailed Jan. 7, 2014, 5 pages.

Chinese Patent Application No. 201380047341.8, First Office Action mailed on Dec. 31, 2015, 7 pages. (7 pages of English Translation).

Office Action from corresponding Japanese Patent Application No. 2015-521056 dated Mar. 16, 2016, 5 pages.

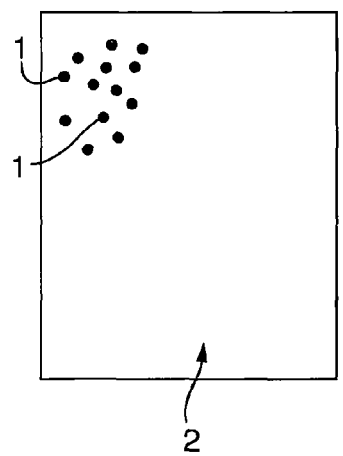 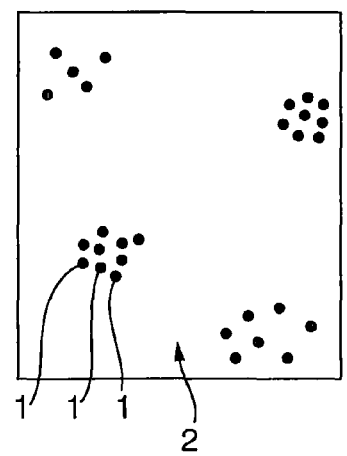 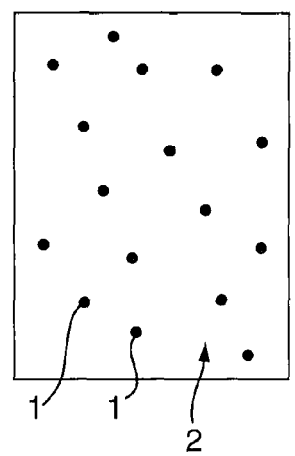
Fig. 1a  Fig. 1b  Fig. 1c
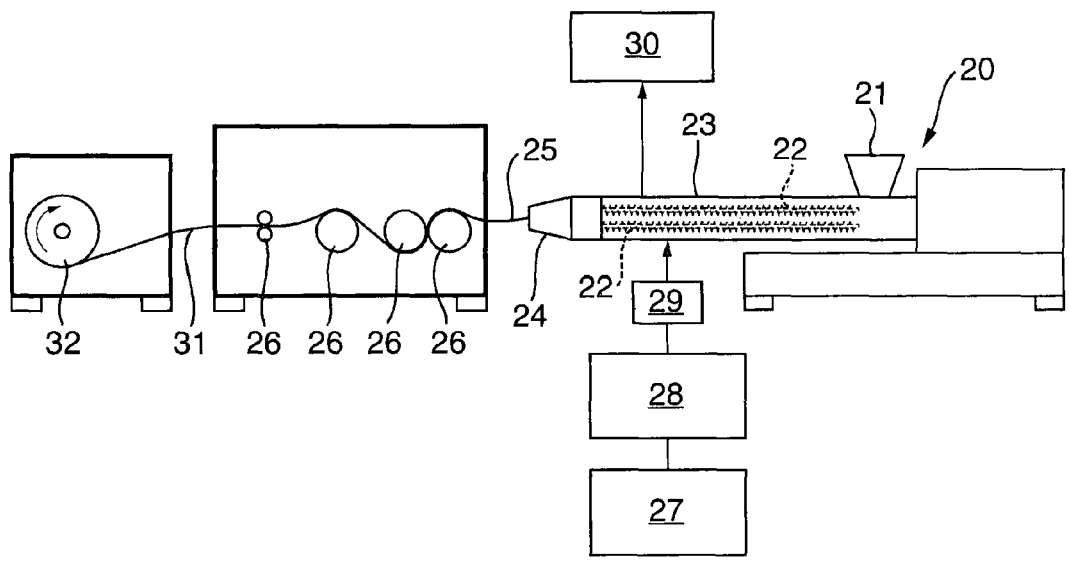
Fig. 2

PROCESS OF MAKING A CONTINUOUS DIELECTRIC FILM COMPRISING DISPERSED NANOPARTICLES

CROSS REFERENCE TO RELATED APPLICATIONS

This application is the U.S. national phase of International Application No. PCT/GB2013/000302 filed on Jul. 12, 2013, and published in English on Jan. 16, 2014 as International Publication No. WO 2014/009686 A1, which application claims priority to Great Britain Patent Application No. 1212487.1 filed on Jul. 13, 2012, the contents of both of which are incorporated herein by reference.

This invention relates to dielectrics and their use in capacitors. A capacitor is a means of storing electronic charge, and generally comprises two conducting plates separated by a dielectric medium. In an ideal system, the plates hold their charge until it is required to be discharged and in doing so can supply electrical energy to a system in a controlled manner.

The factors affecting capacitance are the area of the plates, their separation and the capability of the dielectric medium between them to store charge and hold off the applied voltage. Dielectrics can be made of any suitable insulating material. The greater the permittivity, and the dielectric breakdown strength, the more energy can be stored. Eventually any capacitor will fail as the potential difference rises above the dielectric strength and causes the dielectric to break down electrically.

Dielectrics are often made out of thermoplastics or thermosetting polymers. Thermoplastic materials such as polyethylene terapthalate (PET) polypropylene (PP) polycarbonate and polystyrene have all been used commercially for capacitor dielectric applications, PET and PP being the most common. Thermosetting polymers are also commonly used, either on their own or in combination with other insulating systems. These have relative permittivities in the range of about 2 to 3.5. Other capacitors are known such as ceramics. Ceramics tend to be brittle and often lack sufficient robustness to work effectively in non-benign environments. Additionally, they lack the flexibility of polymer based plastic dielectrics, which can be compactly wound, providing a large surface area with correspondingly higher energy storage densities, under high voltage/field conditions.

The permittivity of dielectric materials is frequency dependent, so that as frequency rises there is a transition from a first permittivity to a second which might have a much lower value. This is due to the manner in which dipolar molecules behave in an electrical field, in addition to electronic and ionic conduction mechanisms. As the field is established, the dipolar molecules move to align themselves along and against the field lines, and in so doing they increase the energy storage capacity of the material. This mechanism enables more energy storage in the capacitor. In an AC system the sinusoidal field causes the molecules to change alignment in accordance with the frequency.

Application GB 1004393.3 demonstrated that a mixture of a polymer with higher permittivity particles distributed throughout the polymer led to enhanced energy density storage. As the particle size approaches the de Broglie wavelength of electrons at or below a certain field strength, the particles behave to the electrons as though 'smeared' throughout the plastic, thereby significantly raising the overall permittivity whilst maintaining the flexibility and, high voltage capability of the dielectric. The de Broglie wavelength of the composite is determined by the electron mobility in the material and the applied electric field, i.e. the electron drift velocity. As the electron mobility is a function of both the base polymer and the material morphology it is important to ensure correct crystallisation out of the molten polymer for the extruded film, which demands a controlled thermo dynamic environment. The de Broglie wavelength can be altered by orders of magnitude simply by altering the crystallisation conditions.

Mixing the particles of the higher permittivity material in such a way as to have a correct distribution in the material is important. The particles must be both dispersed and distributed throughout the polymer.

It is known that it is necessary to introduce high shear rates to ensure appropriate spatial distribution of the particles within the polymer. US 2008/0262126 sets out a method of using compounding as a method to achieve such dispersal and distribution. This compounding step is carried out as a discrete batch method to obtain a masterbatch, which is further processed into a final product. However, in order to produce a continuous feed this in situ mixing is not possible and there is no current way in the process to ensure that particles become appropriately mixed.

It is an object of the present invention to produce a continuous thermoplastic free form (unsupported by a substrate) dielectric film that is evenly loaded with dispersed nanoparticles (nanometric in all dimensions). It is also an object of this invention to produce such a dielectric in a single continuous processing step.

Accordingly the invention provides for a process of making a continuous freeform thermoplastic dielectric film that is evenly loaded with dispersed nanoparticles comprising the steps of:

feeding thermoplastic granules into an extruder;
injecting a secondary feed comprising a suspension of nanoparticles in a liquid carrier to create a nanocomposite;
and extruding said composite onto cooled rollers at a preset rate thereby enabling the crystalline structure of the nanocomposite film to be controlled
wherein the secondary feed is mixed continuously by an ultrasonicator whilst being injected into the extruder.

Such a process enables the Nanocomposite to be created in such a way as to control the de Broglie wavelength and to have appropriately distributed and dispersed particles. The particles may be metal oxides, e.g. titanium dioxide, and the polymer could be PET, polystyrene, parylene, polyethylene, polythene or polypropylene as required.

The term freeform means that the film is not supported on a substrate. This means that there is a reduction in bulk, an increase in flexibility, and importantly enables a capacitor to be wound. This is the basis of a high capacitance, high energy density storage, high voltage capacitor, which has many industrial benefits.

The process utilises a co-rotating, intermeshing, self cleaning, twin screw extruder which allows for high shear rate mixing at a controlled temperature and pressure. The screws interleave and in this case co-rotate at the same rate so that the shear forces on the polymer and the rate of flow are controlled. For certain applications the screws may counter-rotate depending on the shear forces and temperature required. Similarly, the screw pitch can be altered to give a different rheological processing effect. This will be a function of the desired structure and the required thickness and crystalline structure, and this in turn depends on the type of base polymer. Parameters such as shear rates are dependent on the thermo elastic properties of the polymer.

A secondary feed consisting of nanoparticles is fed into the polymer matrix at a given pressure via a lower pressure region of the main extruder barrel. It is necessary to create a low pressure region into which the secondary feed can be injected, and these particles are injected via a low pressure peristaltic pump. This is achieved by providing an appropriate rarefaction within the twin screws' threads, enabling the low viscosity secondary feed to enter while the screw thread continues to rotate so as to pull the mix away at a given rate. The secondary feed is also ultrasonicated prior to injection into the extruder barrel, improving dispersal of the nanoparticles in the secondary feed. Together with high shear rates between the screws, ultrasonication ensures that the nanoparticles are both dispersed and distributed throughout the polymer. The screws and their threads can be set at appropriate pitches and separation to achieve the desired throughputs and shear rates. Ultrasonication may be carried out using a reservoir of liquid (as standard) or may be carried out by utilising an ultrasonicator flow cell. A flow cell allows for more efficient cavitation since all of the material being pumped through the flow cell comes into close proximity with the ultrasonicator probe.

The process allows for extremely long, potentially continuous ribbons of flexible dielectric that can be wound into a capacitor by interleaving with aluminium foil, or any other suitable metallic or non metallic electrode. An advantage of such a ribbon is that it need not be supported by a substrate. Since the process is a single process with no batching, the polymer is not likely to suffer the thermal degradation of a batch-produced polymer in which the plastic is subjected to several heating/ cooling cycles. Also, a single process is far less energy intensive and less likely to introduce impurities or weaknesses into the process:

The invention provides significant benefits over existing nanocomposite film processing techniques in that all others use batch processing methods whereas this invention allows for the fabrication of large scale nanocomposite dielectric film in a single continuous processing step.

It is widely accepted in industry that continuous processing methods are inherently more cost effective for several reasons, for example: shorter residence time of sensitive materials, shorter overall processing time to final product, reduction in the introduction of errors, greater control over processing.

It is possible that different nanoparticles can be injected at more than one part of the extruder barrel. For example, in certain circumstances it may be advantageous to create a lossy dielectric. This is so that in applications where it is undesirable for the charge to linger—say, for example, in an automotive application where a mechanic needs certainty that the charge has dispersed—the dielectric can be designed to loose charge over a predetermined period in a way that does not reduce its energy storage capacity. This can be achieved by introducing electrons into the system. Some loss in a dielectric occurs through dipolar relaxation of the nanoparticles. The additional electrons allow for a larger resistive component to be introduced. This is usually undesirable but in some cases where energy storage is only desirable for a certain period and safety requirements require a bleed off, this would have utility.

One such electron rich material would be silver. Small nano sized spheres of silver can be mixed in with the higher permittivity particles at the injection phase in a separate ultrasonicated feed, thus providing a higher permittivity dielectric that quickly bleeds its voltage away when the potential is removed from the plates.

Alternatively, a second higher permittivity nano particle type might be injected into the extruder.

It may be necessary to pretreat the nano particles before injection. Pre treatment of the particles can assist dispersal within the secondary feed, distribution within the polymer melt inside the barrel and subsequent film, and stabilisation within the final product. Under certain conditions, if not pre-treated, TiO2 can cause catalytic degradation of certain polymers under normal UV light. Also it is known in the art that metal oxides at small diameters are hygroscopic. This can introduce moisture that may electronically degrade the quality of the final product. Pretreatments to prevent this include but are not limited to using surfactants, and surface treatments such as silane coupling to polymers which coat the nanoparticles. A person skilled in the art would understand the pretreatment requirements and how to employ a method appropriate to the final desired dielectric properties based on the specific choice of nano particle.

Although this description has been directed to nanocomposites for dielectrics, it will be appreciated that any appropriate nano-composite could be produced, for example to incorporate UV protection into a polymer or have radiation hardened photo sensitive strips where the benefit to the loaded film is the inclusion of a dispersed and distributed particulate within the polymer matrix.

Indeed, the invention allows for a single process that manufactures a continuous free form flexible nano composite product of any nano particle within a polymer matrix.

A specific embodiment of the invention will now be described by reference to the following drawings:

FIG. 1 shows particles distributed and dispersed in a material

FIG. 2 shows a schematic of the process

FIG. 1 explains the terms distributed and dispersed. Particles 1 are contained in a Matrix 2. In 1a the particles 1 are clumped in one area. These are neither dispersed nor distributed. In 1b, there are several random clumps of particles 1. These are distributed but not dispersed. In 1c, the particles are both dispersed and distributed.

Turning to FIG. 2, this shows the process. General extrusion of polystyrene is known in the art. Polystyrene granules are added into the machine (20) via a hopper (21) and entrained by overlapping co-rotating screws (22) situated inside a barrel (23) which through friction and shear forces cause the polystyrene to melt. The temperature along the screws (22) is measured and controlled to ensure that it and the pressure are constant. At the end of the machine (20) the molten polystyrene is extruded through a dye (24) to determine the shape of the ribbon (25) that emerges. The ribbon (25) is then passed over cooled polished rollers (26) to solidify it.

The machine (20) in this case is a twin screw extrusion line with secondary feed made by Rondol Technologies.

Nanoparticles suspended in a volatile liquid carrier such as toluene or ethyl acetate are fed through a secondary feed reservoir (27) via a low pressure peristaltic pump (28) into a flow cell (29) that ultrasonicates the nanoparticles prior to injection into a low pressure region of the barrel (23). The volatile liquid carrier containing the nanoparticles is continuously injected into the barrel (23) (where it becomes entrained in the screws (22)) under pressure produced by the low pressure peristaltic pump (28). This allows the nanoparticles to disperse within the polystyrene as it is melted and transported through the barrel (23), which creates a well distributed mix of nanoparticles within the transported melted polystyrene. To further ensure full dispersion of the nanoparticles by preventing particle agglomeration prior to injection, the volatile liquid carrier containing the nanoparticles is also under continuous ultrasonication prior to entry into the flow cell (29). Prior to extrusion through the dye (24), the volatile liquid carrier is evaporated off (30) and recycled and the resultant polystyrene and nanoparticle mix is extruded onto the cooled polished rollers (26). The rollers (26) are paired and cooled to produce a cooling rate that gives the desired crystal size. This is controlled to enable the most suitable crystal structure without forming spherulites. The rollers (26) are polished to give a defect free surface, as in a ribbon of microns thickness a small defect might have a significant effect on the quality of the product. The resultant cooled ribbon (31) is rolled onto a reel (32).

A skilled person will appreciate that there is a trade off between crystal size and residual internal mechanical stress of the polymer crystals, although this may be eliminated through reheating to reduce some of this stress. Similarly, other extruder/cooler mechanisms such as calendering as opposed to casting may be used depending on the desired thickness and application.

A further secondary feed could be provided, although this is optional. For example, a further secondary feed of silver particles in the nanometre range could be introduced so as to provide electrons that will ensure the capacitor bleeds voltage off when the voltage is not required, or a different higher permittivity nanoparticle could be introduced should the desired dielectric properties require it.

The invention claimed is:

1. A process of making a continuous freeform thermoplastic dielectric film for use at high voltage that is evenly loaded with dispersed nanoparticles comprising the steps of:
   feeding thermoplastic granules into an extruder;
   injecting a secondary feed comprising a suspension of nanoparticles in a liquid carrier to create a nanocomposite;
   continuously mixing the secondary feed by an ultrasonicator whilst injecting it into the extruder;
   and extruding the nanocomposite onto cooled rollers at a preset rate thereby enabling the crystalline structure of the dielectric film to be controlled;
   wherein the nanoparticles are geometrically controlled to each have no diameter that is greater than the De Broglie wavelength of an electron in the thermoplastic granules.

2. A process according to claim 1 in which the secondary feed is further ultrasonicated by a flow cell.

3. A process according to claim 1 in which the nanoparticles comprise titanium dioxide.

4. A process according to claim 1 where the liquid carrier is toluene.

5. A process according to claim 1 where the liquid carrier is ethyl acetate.

6. A process according to claim 1 that further comprises the step of injecting an additional feed of nanoparticles that are selected to provide extra electrons.

7. A process according to claim 6 in which the nanoparticles in the additional feed comprise silver.

* * * * *